(12) United States Patent
Greenland

(10) Patent No.: US 8,763,805 B2
(45) Date of Patent: Jul. 1, 2014

(54) DEVICE FOR CONTAINING AND RELEASING A SAMPLE MATERIAL

(75) Inventor: Steven J. Greenland, Hampton, NH (US)

(73) Assignee: AKI, Inc., New York, NY (US)

( * ) Notice: Subject to any disclaimer, the term of this patent is extended or adjusted under 35 U.S.C. 154(b) by 0 days.

(21) Appl. No.: 12/648,324

(22) Filed: Dec. 29, 2009

(65) Prior Publication Data

US 2010/0163447 A1    Jul. 1, 2010

Related U.S. Application Data

(60) Provisional application No. 61/141,936, filed on Dec. 31, 2008.

(51) Int. Cl.
*B65D 73/00*    (2006.01)

(52) U.S. Cl.
USPC ............................. 206/460; 206/461; 206/484

(58) Field of Classification Search
CPC ............ B65D 73/00; A61L 9/00; A61L 9/12; A61L 15/46; B32B 31/00; B32B 7/00; B32B 7/04; B32B 7/06; B32B 7/12
USPC ................ 206/231, 823, 484, 581, 39.3, 447; 424/448, 449; 428/905, 324, 92.1
See application file for complete search history.

(56) References Cited

U.S. PATENT DOCUMENTS

| | | | |
|---|---|---|---|
| 2,552,870 A | 5/1951 | Scherer |
| 2,648,463 A | 8/1953 | Scherer |
| 2,705,579 A | 4/1955 | Mason |
| 2,707,581 A | 5/1955 | Kaplan |
| 2,717,174 A | 9/1955 | Casanovas |

(Continued)

FOREIGN PATENT DOCUMENTS

| | | |
|---|---|---|
| AR | 024191 A1 | 9/2002 |
| AR | 027778 A1 | 4/2003 |

(Continued)

OTHER PUBLICATIONS

Dow Introduces HYPOD™ Polyolefin Dispersions, *Breakthrough Technology Used to Make Waterborne Dispersions of Polymers*, http://news.dow.com/prodbus/2007/20070711b.htm, Midland, MI—Jul. 11, 2007.

(Continued)

*Primary Examiner* — Andrew Perreault
(74) *Attorney, Agent, or Firm* — Jones Day

(57) ABSTRACT

A device for containing and releasing a sample material having a first structural layer, a second structural layer, and a frangible layer containing a sample material attaching the first structural layer to the second structural layer. The sample material may be a fragrance. The device may further include a substrate such as a printed carrier sheet having a first panel and a second panel. The sampler may be placed on the second panel and the first panel is folded over the sampler to form the device. When the substrate is unfolded, the frangible layer separates for access to the sample material.

18 Claims, 6 Drawing Sheets

(56) References Cited

U.S. PATENT DOCUMENTS

| | | |
|---|---|---|
| RE24,251 E | 12/1956 | Kaplan et al. |
| 2,956,710 A | 10/1960 | O'Connor |
| 2,962,192 A | 11/1960 | Volckening |
| 3,116,077 A | 12/1963 | Bird |
| 3,184,121 A | 5/1965 | Volckening |
| 3,278,085 A | 10/1966 | Brown |
| 3,307,281 A | 3/1967 | Mateo |
| 3,334,790 A | 8/1967 | Eaton |
| 3,414,414 A | 12/1968 | Christine et al. |
| 3,450,256 A | 6/1969 | Chandler et al. |
| 3,456,784 A | 7/1969 | Sirago |
| 3,616,898 A | 11/1971 | Massie |
| 3,630,346 A | 12/1971 | Burnside |
| 3,655,129 A | 4/1972 | Seiner |
| 3,741,384 A | 6/1973 | Cloud |
| 3,749,236 A | 7/1973 | Dahl |
| 3,858,807 A | 1/1975 | Rabussier et al. |
| 3,913,734 A | 10/1975 | Siegel |
| 3,917,116 A | 11/1975 | Mason |
| 4,094,119 A | 6/1978 | Sullivan |
| 4,145,001 A | 3/1979 | Weyenberg et al. |
| 4,155,454 A | 5/1979 | Ryden |
| 4,168,002 A | 9/1979 | Crosby |
| 4,209,096 A | 6/1980 | Carkhuff |
| 4,277,024 A | 7/1981 | Spector |
| 4,283,011 A | 8/1981 | Spector |
| 4,356,969 A | 11/1982 | Obermayer et al. |
| 4,369,885 A | 1/1983 | Redmond |
| 4,415,084 A | 11/1983 | Hauser et al. |
| 4,484,768 A | 11/1984 | Norfleet |
| 4,487,801 A | 12/1984 | Turnbull et al. |
| 4,603,069 A | 7/1986 | Haq et al. |
| 4,612,223 A | 9/1986 | Spector |
| 4,648,506 A | 3/1987 | Campbell |
| 4,696,844 A | 9/1987 | Spector |
| 4,717,017 A | 1/1988 | Sprinkel, Jr. et al. |
| 4,720,409 A | 1/1988 | Spector |
| 4,720,417 A | 1/1988 | Sweeny et al. |
| 4,739,778 A | 4/1988 | Christie |
| 4,751,934 A | 6/1988 | Moir et al. |
| 4,753,389 A | 6/1988 | Davis |
| 4,814,212 A | 3/1989 | Spector |
| 4,824,143 A | 4/1989 | Grainger |
| 4,824,707 A | 4/1989 | Spector |
| 4,848,378 A | 7/1989 | Moir et al. |
| 4,871,091 A | 10/1989 | Preziosi |
| 4,874,129 A | 10/1989 | DiSapio et al. |
| 4,880,690 A | 11/1989 | Szycher et al. |
| 4,889,755 A | 12/1989 | Charbonneau |
| 4,898,328 A | 2/1990 | Fox et al. |
| 4,908,252 A | 3/1990 | Carnahan et al. |
| 4,921,137 A | 5/1990 | Heijenga |
| 4,923,063 A | 5/1990 | Tararuj |
| 4,925,517 A | 5/1990 | Charbonneau et al. |
| RE33,299 E | 8/1990 | Sweeny et al. |
| 4,998,621 A | 3/1991 | Meehan |
| 5,009,894 A | 4/1991 | Hsiao |
| 5,050,909 A | 9/1991 | Mertens |
| 5,050,910 A * | 9/1991 | Schechter et al. ............ 428/905 |
| 5,071,704 A | 12/1991 | Fischel-Ghodsian |
| 5,093,182 A | 3/1992 | Ross |
| 5,111,932 A | 5/1992 | Campbell |
| 5,161,688 A | 11/1992 | Muchin |
| 5,188,236 A | 2/1993 | Sayers et al. |
| 5,192,386 A | 3/1993 | Moir et al. |
| 5,242,521 A | 9/1993 | Hibsch et al. |
| 5,248,537 A | 9/1993 | Giannavola |
| 5,249,676 A | 10/1993 | Ashcraft et al. |
| 5,304,358 A | 4/1994 | Hoyt et al. |
| 5,307,934 A | 5/1994 | Hagner |
| 5,341,992 A | 8/1994 | Bishopp |
| 5,342,420 A | 8/1994 | Bosses |
| 5,380,110 A | 1/1995 | Festa |
| 5,389,174 A | 2/1995 | Hibsch et al. |
| 5,391,420 A | 2/1995 | Bootman et al. |
| 5,395,047 A | 3/1995 | Pendergrass, Jr. |
| 5,419,958 A | 5/1995 | Charbonneau |
| 5,439,172 A | 8/1995 | Comyn et al. |
| 5,445,821 A | 8/1995 | Brown et al. |
| 5,455,043 A | 10/1995 | Fischel-Ghodsian |
| 5,529,224 A | 6/1996 | Chan et al. |
| 5,535,885 A | 7/1996 | Daniel et al. |
| 5,562,112 A | 10/1996 | Gunderman et al. |
| 5,568,866 A | 10/1996 | Grosskopf et al. |
| 5,577,947 A | 11/1996 | Malloy et al. |
| 5,609,710 A | 3/1997 | Charbonneau |
| 5,622,263 A | 4/1997 | Greenland |
| 5,645,161 A | 7/1997 | Whitaker et al. |
| 5,647,941 A | 7/1997 | Gunderman et al. |
| 5,690,130 A | 11/1997 | Gunderman et al. |
| 5,715,849 A | 2/1998 | Vanbraekel |
| 5,716,000 A | 2/1998 | Fox |
| 5,782,060 A | 7/1998 | Greenland |
| 5,839,609 A | 11/1998 | Zakensberg |
| 5,879,769 A | 3/1999 | Greenland et al. |
| 5,885,701 A | 3/1999 | Berman et al. |
| 5,899,382 A | 5/1999 | Hayes et al. |
| 5,904,028 A | 5/1999 | Fujiura |
| 5,908,208 A | 6/1999 | Lapsker |
| 5,928,748 A | 7/1999 | Jones et al. |
| 5,944,188 A | 8/1999 | Grosskopf et al. |
| 5,953,885 A | 9/1999 | Berman et al. |
| 5,980,960 A | 11/1999 | Amitai |
| 6,006,916 A | 12/1999 | Matsos et al. |
| 6,085,942 A | 7/2000 | Redmond |
| 6,103,040 A | 8/2000 | Hunkeler |
| 6,125,614 A | 10/2000 | Jones et al. |
| 6,182,420 B1 | 2/2001 | Berman et al. |
| 6,213,303 B1 | 4/2001 | Harris et al. |
| 6,245,176 B1 | 6/2001 | Greenland |
| 6,250,049 B1 | 6/2001 | Feldman et al. |
| 6,251,408 B1 | 6/2001 | Dobler |
| 6,261,347 B1 | 7/2001 | Moreland |
| 6,287,652 B2 | 9/2001 | Speckhals et al. |
| 6,301,860 B1 | 10/2001 | Gunderman et al. |
| 6,326,069 B1 | 12/2001 | Barnett et al. |
| 6,348,246 B1 | 2/2002 | Finestone et al. |
| 6,364,097 B1 | 4/2002 | Whitaker et al. |
| 6,403,186 B1 | 6/2002 | Tararuj et al. |
| 6,461,620 B2 | 10/2002 | Dobler |
| 6,541,052 B1 | 4/2003 | Rohleder |
| 6,557,731 B1 | 5/2003 | Lyon et al. |
| 6,612,429 B2 | 9/2003 | Dennen |
| 6,656,256 B2 | 12/2003 | Moreland |
| 6,686,013 B1 | 2/2004 | Tebbe |
| 6,688,467 B2 | 2/2004 | Krupka et al. |
| 6,691,872 B1 | 2/2004 | Berman et al. |
| 6,705,541 B2 | 3/2004 | Schuehrer et al. |
| 6,726,797 B2 | 4/2004 | Tararuj et al. |
| 6,736,335 B2 | 5/2004 | Cuthbert |
| 6,929,128 B2 | 8/2005 | Caldwell et al. |
| 7,213,770 B2 | 5/2007 | Martens, III et al. |
| 7,241,066 B1 | 7/2007 | Rosen et al. |
| 7,348,024 B2 | 3/2008 | Tararuj |
| 8,141,709 B2 | 3/2012 | Klaus |
| 2001/0009175 A1 | 7/2001 | Speckhals et al. |
| 2001/0023017 A1 | 9/2001 | Tararuj et al. |
| 2002/0157983 A1 | 10/2002 | Krupka et al. |
| 2002/0185401 A1 | 12/2002 | Duquet et al. |
| 2003/0085298 A1 | 5/2003 | Schuehrer et al. |
| 2003/0213724 A1 | 11/2003 | Dobler |
| 2005/0011794 A1 | 1/2005 | Caldwell et al. |
| 2005/0061710 A1 | 3/2005 | Dobler |
| 2005/0196571 A1 | 9/2005 | Penny, III et al. |
| 2006/0021901 A1 | 2/2006 | Dobler et al. |
| 2006/0263579 A1 | 11/2006 | Field, Jr. |
| 2007/0014992 A1 | 1/2007 | Longmoore |
| 2007/0068845 A1 | 3/2007 | Schuehrer |
| 2007/0228073 A1 | 10/2007 | Mazzarino |
| 2007/0243239 A1 | 10/2007 | Lanser |
| 2007/0251131 A1 | 11/2007 | Majerowski |
| 2008/0000786 A1 | 1/2008 | Collotta et al. |
| 2008/0011319 A1 | 1/2008 | Ripoli |
| 2009/0050506 A1 | 2/2009 | Dobler |

(56) References Cited

U.S. PATENT DOCUMENTS

| | | | |
|---|---|---|---|
| 2009/0071978 | A1 | 3/2009 | Sharp et al. |
| 2009/0071979 | A1 | 3/2009 | Sharp et al. |
| 2010/0163447 | A1 | 7/2010 | Greenland |

FOREIGN PATENT DOCUMENTS

| | | |
|---|---|---|
| AR | 034618 A1 | 3/2004 |
| CN | 101119907 A | 2/2008 |
| DE | 3122237 | 1/1983 |
| DE | 29918311 | 1/2000 |
| DE | 20102282 | 6/2001 |
| DE | 20111705 | 10/2001 |
| DE | 20214971 | 1/2003 |
| DE | 20114352 | 2/2003 |
| DE | 202004000591 | 4/2004 |
| DE | 202004007692 | 8/2004 |
| DE | 202005003504 | 6/2005 |
| DE | 202005010301 | 11/2005 |
| DE | 102007044829 | 3/2009 |
| EP | 0263327 | 9/1987 |
| EP | 0722676 | 7/1996 |
| EP | 0963715 | 12/1999 |
| EP | 1078865 | 2/2001 |
| EP | 1234521 | 8/2002 |
| EP | 1295613 | 3/2003 |
| FR | 2796368 | 1/2001 |
| GB | 2390841 | 1/2004 |
| JP | 63-054232 | 3/1988 |
| JP | 2000-351153 | 12/2000 |
| NL | 1021615 | 6/2004 |
| WO | WO 92/14607 | 9/1992 |
| WO | WO 93/24031 | 12/1993 |
| WO | WO 94/12072 | 6/1994 |
| WO | WO 98/01361 | 1/1998 |
| WO | WO 98/48659 | 11/1998 |
| WO | WO 99/39907 | 8/1999 |
| WO | WO 99/47431 | 9/1999 |
| WO | WO 2004/030821 | 4/2004 |
| WO | WO 2005/027684 | 3/2005 |

OTHER PUBLICATIONS

New Polyolefin Dispersions Offer Environmentally Preferable Option in Carpet Backing, *Dow to showcase enabling BLUEWAVE™ Technology at Greenbuild Expo 2007*, http://news.dow.com/dow_news/prodbus/2007/20071107b.htm, Chicago, IL—Nov. 7, 2007.

HYPOD Polyolefin Dispersions Offer Balance of Sustainability and Performance, http://news.dow.com/prodbus/2008/20080801a.htm, Midland, MI—Aug. 1, 2008.

HYPOD Polyolefin Dispersions, http://www.dow.com/dowpod/.

Dow Epoxy : Waterborne Mechanical Dispersions of Polyolefins, http://epoxy.dow.com/epoxy/news/trade.htm, Mar. 2006.

Michelman—Your Competitive Edge™—Michem Dispersion, http://www.michem.com/Products/Michem-Dispersion, Sep. 26, 2008.

Dispersions—Paramelt—Waxes, Adhesives & Dispersions, http://www.paramelt.com/markets.and.products.Dispersions.htm, Sep. 26, 2008.

European Search Report mailed Dec. 6, 2010 for EP 10173101.6-2308.

International Search Report mailed Oct. 6, 2010 for International Application No. PCT/US2010/045719, filed Aug. 17, 2010.

International Search Report mailed Feb. 9, 2010 for International Application No. PCT/US2009/069631, filed Dec. 29, 2009.

Non-final Office Action mailed Oct. 1, 2010 for U.S. Appl. No. 12/262,082, filed Oct. 30, 2008.

Office Action mailed Jun. 21, 2012 for U.S. Appl. No. 12/857,587, filed Aug. 7, 2010.

Office Action mailed Jun. 1, 2012 for U.S. Appl. No. 12/262,082, filed Oct. 30, 2008.

Office Action mailed Dec. 29, 2011 for U.S. Appl. No. 12/857,587, filed Aug. 17, 2010.

Office Action mailed Jul. 30, 2012 for U.S. Appl. No. 13/423,692, filed Mar. 19, 2012.

Office Action mailed Jan. 18, 2013 for U.S. Appl. No. 12/857,587, filed Aug. 17, 2010.

\* cited by examiner

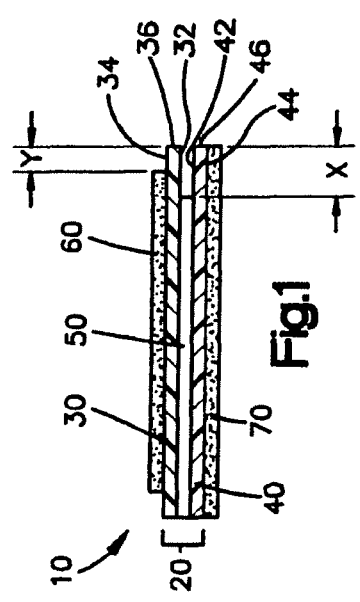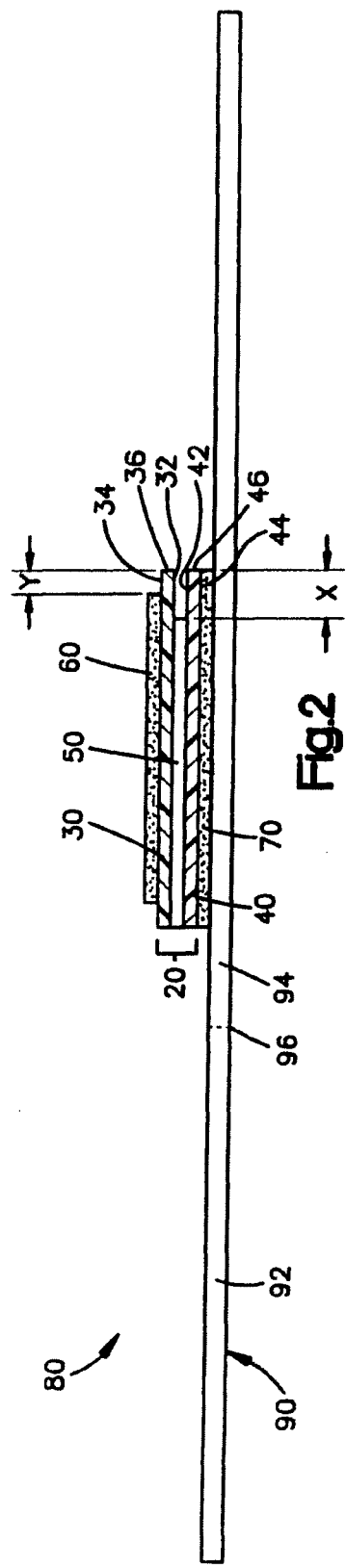

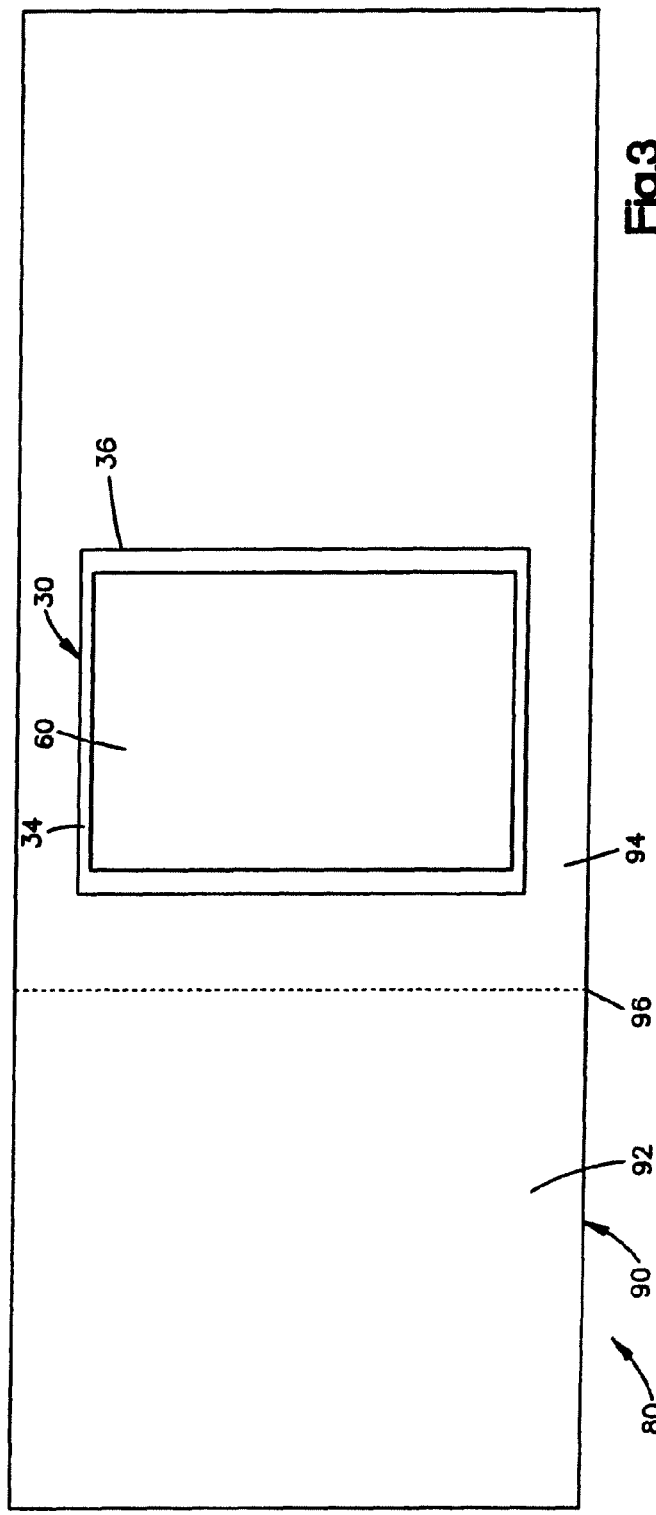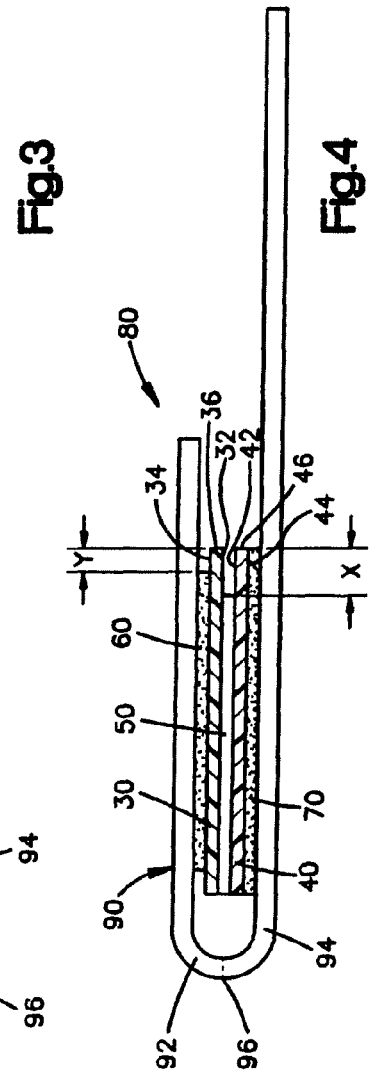

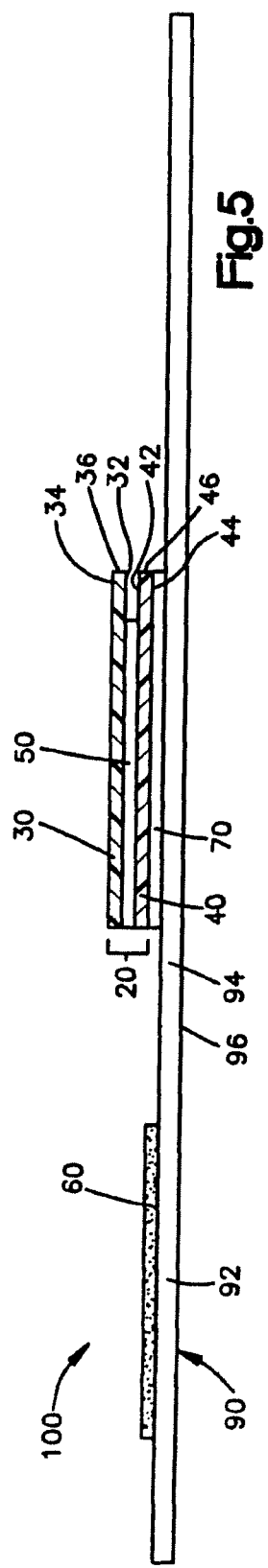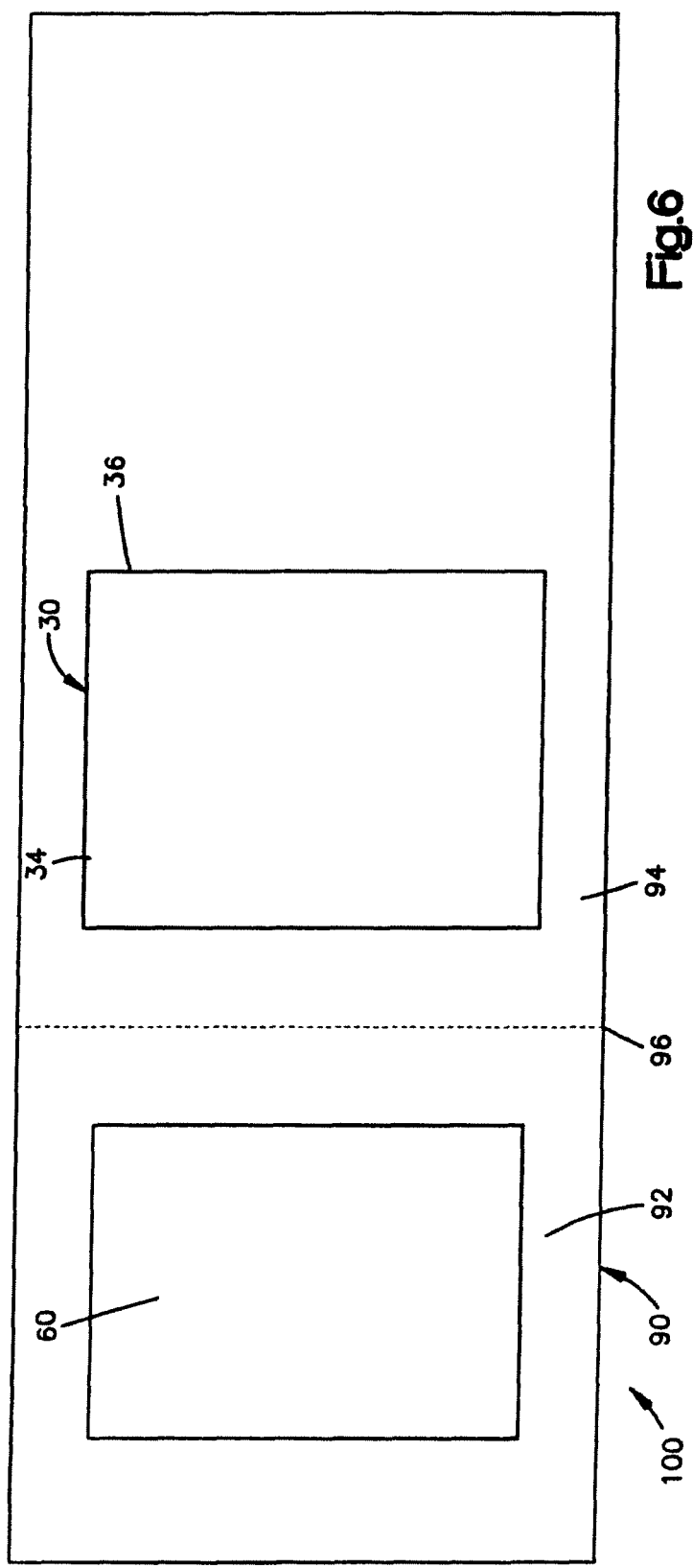

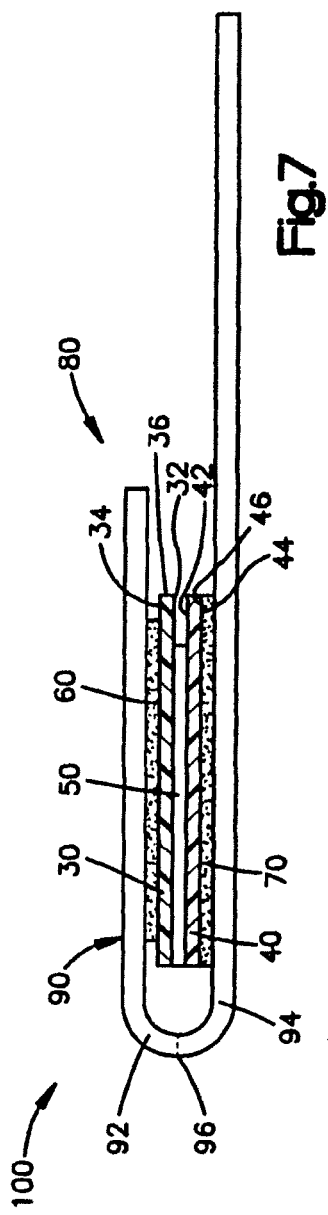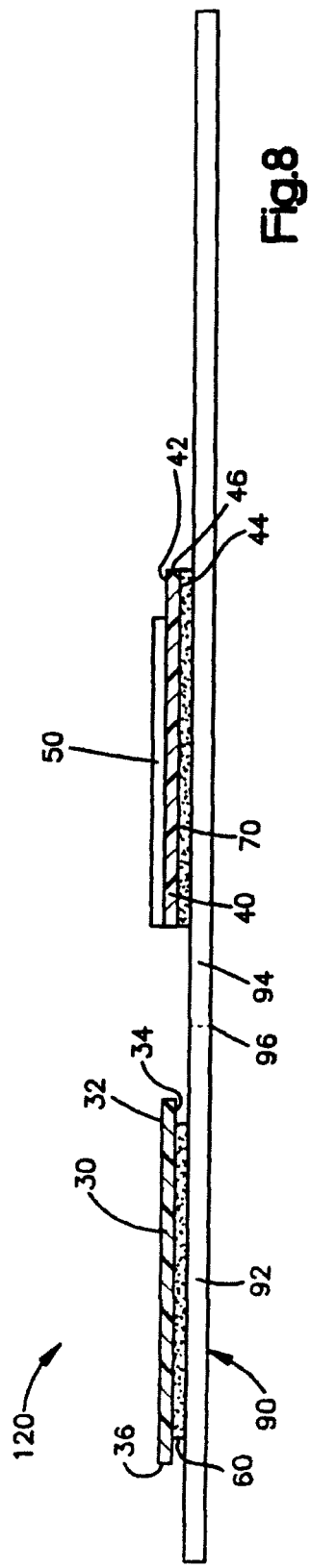

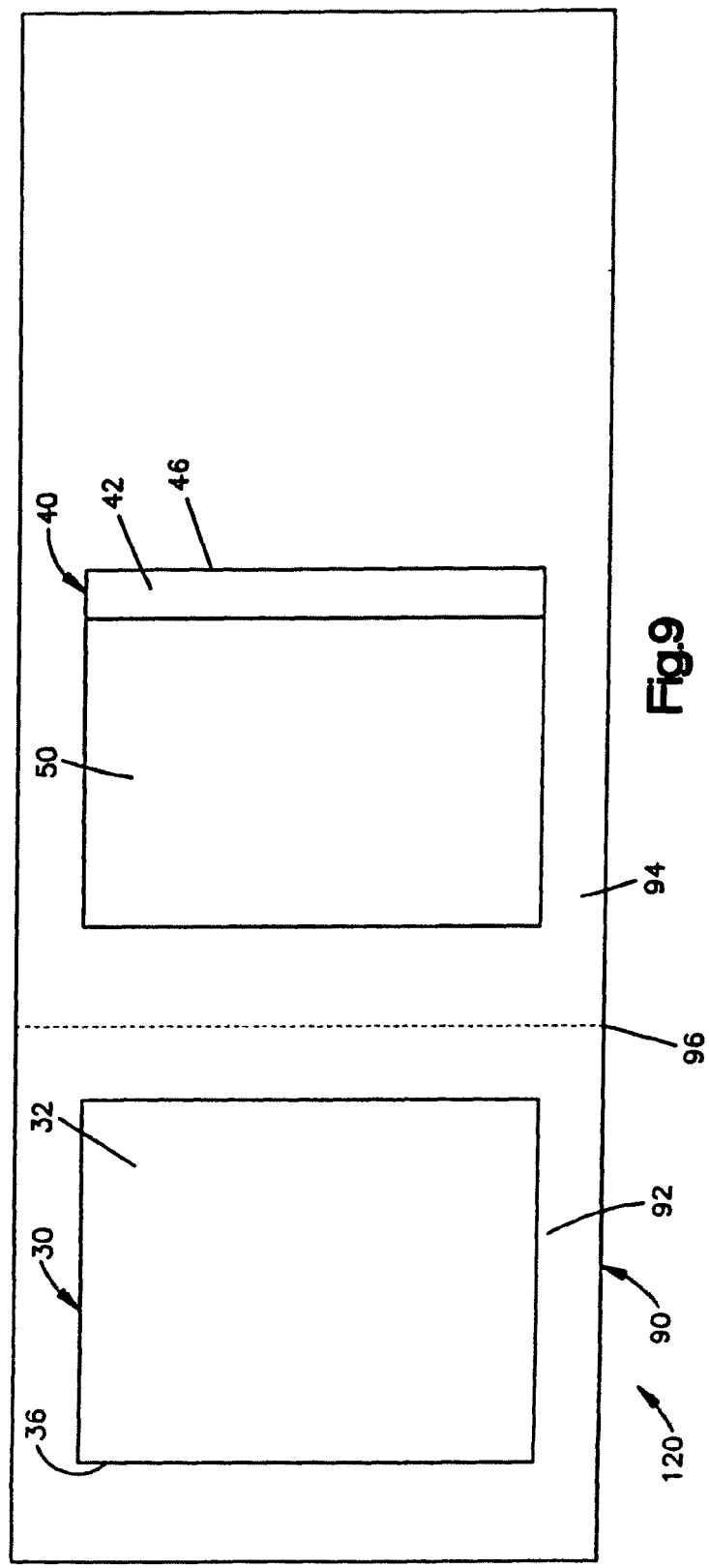

DEVICE FOR CONTAINING AND RELEASING A SAMPLE MATERIAL

This application claims priority to U.S. Provisional Patent Application No. 61/141,936, filed Dec. 31, 2008, incorporated herein by reference in its entirety.

FIELD OF THE INVENTION

The invention generally relates to devices such as graphic media devices for containing and releasing a sample material such as a fragrance. In particular, the invention relates to such devices that include a preformed laminate enclosure or sampler having a frangible layer that is attached to a substrate such as a page of a magazine and methods of making such devices.

BACKGROUND OF THE INVENTION

Manufacturers of a variety of products, especially perfume and other cosmetics, often distribute small representations or samples of their products to potential customers. This task is generally accomplished by combining the sample material with a printed promotional advertising carrier, which is then distributed directly to potential customers or included in magazines or other publications or advertisements which are then distributed to and read by potential customers.

Not only do sampler devices allow potential customers to sample a product, the devices also serve an important brand identity function. Carefully composed artwork and advertising text is printed on the composite sampler devices. The quality and visual appeal of the composite sampler device is essential to promoting an upscale perception of the brand represented.

Prior sampler devices are most frequently made of paper, and most paper is permeable to liquids and/or volatile materials present in many sample materials such as cosmetics or perfumes. Thus, the sample material or its components may migrate through the paper, resulting not only in unwanted premature release but also in a visual blemish and defect of the printed image and message.

Also, existing sampler devices have other functional limitations which greatly constrain the range of materials which may be used in their construction. For example, existing sampler devices such as detailed in U.S. Pat. No. 4,925,517 to Charbonneau, et al. commonly use microcapsules to deliver a fragrance oil. Such microcapsules are highly sensitive to the chemistry and odor of the substrate selected for the printed carrier. For example, current alkaline "free sheet" paper manufacturing process used for publishing paper presents a considerable problem. The sample materials as well as the microcapsules may be sensitive to the pH of the paper. Objectionable discoloration of the sample material also often results.

The paper substrate selected for existing pull apart microcapsule type samplers must also provide sufficient minimum interfacial ply strength to reliably act on and cause tensile failure of the microcapsules without damage to the paper. The ultimate cohesive strength of the fugitive bond bearing the microcapsules generally falls within a tight range of acceptable force. But active process control of this bond strength during manufacture is extremely difficult due to an extended dry and cure times of the microcapsule complex.

Paper failure or inherent stress on opening also causes unsightly and objectionable damage to the printed carrier, creative image and printed advertising copy. A user may not be able to open the sampler without ripping the sampler itself.

In order to comply with mailing restrictions imposed under federal code, the paper substrate must also provide a minimum Gurley porosity level that is suitable for the containment of transient odor. Standard offset printing inks prohibit attaining a glue bond with sufficient tensile strength to act on and open the microcapsules and may contaminate the contained sample with an objectionable odor. Prior sampling devices are also generally precluded from having any graphic applied to the area containing the sample material.

In addition, certain desirable materials such as recycled paper may not be used for most sampler devices because direct exposure of the liquid sample materials to the paper can release latent odors in the paper which may alter the smell of scent samples. It would be desirable to prevent contamination of the sample material from paper or ink that may routinely occur within the commercial printing environment. Such contamination may cause an adverse chemical reaction with the sample material that will negatively impact the quality and odor of the sample.

It is also difficult to incorporate certain other materials such as cardboard into the assembly process for a sampler. Moreover, it is often difficult to efficiently incorporate a sampler into an advertisement or magazine production process without detrimental impact on the appearance of the advertisement. For example, there is also an unavoidable loss of visual continuity in the advertising creative due to requirements and specific tolerances for removing graphics from the printed carrier within the area of the presented sample material.

There is therefore a need for a sampler device which substantially isolates the sample material from a substrate or carrier sheet; can easily be opened without destroying the sampler packaging itself; allows unobstructed print and creative continuity; reduces permeation of the sample material components through the sampler device or interaction of the sample material with other components of the sampler; may be constructed from a large selection of widely-available materials; provides for prefabrication and off line inspection of a sampler or subassembly that provides the active sample component; and can be quickly and inexpensively produced in mass quantities.

SUMMARY OF THE INVENTION

A device for containing a sampler is provided that is structurally designed for easy access to a sample material while maintaining the integrity of the package, and that can be manufactured in a manner that allows great flexibility with respect to graphics, advertisements, types of substrates to which the sampler is affixed, and machine tolerances with respect to placement of the device on a substrate during manufacture without adversely impacting the ability to easily open the device.

In one embodiment, the device for containing a sample material comprises a first structural layer having an inner surface, an outer surface, and an edge; and a second structural layer having an inner surface and an outer surface, wherein the second structural layer is separate from the first structural layer, and the outer surfaces of the first and second structural layers comprise an adhesive. Preferably, the adhesive on the outer surface of at least one of the first structural layer and the second structural layer is a pressure sensitive adhesive. A frangible layer which contains a sample material, such as a fragrance, therein attaches the inner surface of the first structural layer to the inner surface of the second structural layer. Also, the frangible layer is set back from the edge of the first structural layer a first distance, and the adhesive on the outer surface of the first structural layer is set back from the first structural layer edge a second distance that is less than the first distance. The first structural layer and the second structural layer each comprise a material that has a Z direction strength that is substantially greater than the Z direction strength of the frangible layer between the first and second structural layers.

Upon application of tensile or peel force stress between the first structural layer and the second structural layer, the frangible layer breaks for access to the sample material.

The frangible layer may comprise an adhesive line within the periphery of the inner surfaces of the first and second structural layers thereby forming an enclosure, and the sample material is disposed within the enclosure, or the frangible layer may comprise an adhesive admixed with the sample material. The first structural layer and the second structural layer may be resealable. Also, the device is preferably planar.

In another embodiment, the device described above further includes a substrate, such as a printed carrier substrate, including a first panel and a second panel, wherein the first panel and the second panel are continuous and divided by a fold line. The outer surface of the second structural layer of the sampler is attached to the second panel of the substrate such that the edge of the first structural layer is the side of the first structural layer that is furthest from the fold line. When the substrate is folded at the fold line, the adhesive on the outer surface of the first structural layer contacts the first panel thereby attaching the first panel of the substrate to the outer surface of the first structural layer. Upon application of peel force stress between the first structural layer and the second structural layer, the frangible layer breaks for access to the sample material.

Preferably, the first structural layer and the second structural layer each comprise a material that has a Z direction strength that is substantially greater than the Z direction strength of the frangible layer between the first structural layer and the second structural layer.

Preferably, the frangible layer forms a first bond between the inner surfaces of the first structural layer and the second structural layer, and the adhesive between the first panel and the outer surface of the first structural layer forms a second bond, wherein the Z direction tensile strength of the second bond is stronger than the Z direction tensile strength of the first bond.

The adhesive on the outer surface of at least one of the first structural layer and the second structural layer is preferably a pressure sensitive adhesive.

The frangible layer may comprise an adhesive line within the periphery of the inner surfaces of the first structural layer and the second structural layer thereby forming an enclosure wherein the sample material is disposed within the enclosure, or the frangible layer may comprise an adhesive admixed with the sample material.

The sample material preferably comprises a fragrance. At least one of the first structural layer and the second structural layer may be substantially transparent to light such that type face or graphic images may be viewed therethrough. The first structural layer and the second structural layer may be resealable. The sampler may be planar.

In yet another embodiment, a device for containing a sample material comprises: a first structural layer having an inner surface, an outer surface, and an edge; and a second structural layer having an inner surface and an outer surface, wherein the second structural layer is separate from the first structural layer. A frangible layer attaches the inner surface of the first structural layer to the inner surface of the second structural layer to form a sampler, wherein a sample material such as a fragrance is contained in the frangible layer.

The device further comprises a printed carrier substrate having a first panel and a second panel, wherein the first panel and the second panel are continuous and divided by a fold line, wherein the outer surface of the second structural layer of the sampler is attached to the second panel of the substrate, and the edge of the first structural layer is the side of the first structural layer furthest from the fold line. A permanent adhesive is applied to a portion of the first panel of the substrate such that the adhesive contacts the outer surface of the first structural layer thereby attaching the first panel of the substrate to the outer surface of the first structural layer when the substrate is folded at the fold line. The area covered by the adhesive on the first panel is less than the area of the outer surface of the first layer. Also, the frangible layer is set back from the first layer edge a first distance. When the substrate is folded at the fold line, the adhesive on the first panel is set back from the first structural layer edge a second distance that is less than the first distance. One panel acts as a lift tab for unfolding the substrate at the fold line thereby separating the first structural layer from the second structural layer and breaking the frangible layer for access to the sample material.

Preferably, the first structural layer and the second structural layer each comprise a material that has a Z direction strength that is greater than the Z direction strength of the frangible layer between the first structural layer and the second structural layer.

The frangible layer may include an adhesive near the periphery of the inner surfaces of the first structural layer and the second structural layer thereby forming an enclosure, wherein the sample material is disposed in the enclosure, or the frangible layer may comprise an adhesive admixed with the sample material.

At least one of the first structural layer and the second structural layer may be substantially transparent to light such that the type face or graphic images may be viewed therethrough. Also, the first structural layer and the second structural layer may be resealable. Preferably, the sampler is planar Also provided herein are methods of making the devices described herein. In one embodiment, the method for making a device for containing a sample material comprises providing a first structural layer having an inner surface, an outer surface, and an edge; and providing a second structural layer having an inner surface and an outer surface. The second structural layer is separate from the first structural layer. The method also includes forming a frangible layer between the inner surface of the first structural layer and the inner surface of the second structural layer to attach the inner surface of the first structural layer to the inner surface of the second structural layer. The frangible layer can attach the inner surfaces of the first and second structural layers by a heat seal. The frangible layer includes a sample material. An adhesive can be applied to the outer surfaces of the first structural layer and the second structural layer. The adhesive can cover less than the entire area of the outer surface of the first structural layer. The frangible layer is set back from the edge of the first structural layer a first distance. The adhesive on the outer surface of the first structural layer is set back from the edge of the first structural layer a second distance that is less than the first distance. In addition, the first structural layer and the second structural layer each comprise a material that has a Z direction strength that is substantially greater than the Z direction strength of the frangible layer between the first structural layer and the second structural layer. Also, upon application of peel force stress between the first structural layer and the second structural layer, the frangible layer breaks for access to the sample material.

Furthermore, the method can also comprise a step of applying release liners to the adhesive applied to the outer surfaces of the first structural layer and the second structural layer. Moreover, the method can further comprise attaching the device to a substrate.

The substrate can include a first panel and a second panel. The outer surface of the second structural layer can be attached to the second panel by an adhesive, such as the adhesive applied to the outer surface of the second structural layer. In some embodiments, the first panel and second panel of the substrate are continuous and divided by a fold line. The method can include the step of folding the substrate at the fold line to attach the first panel of the substrate to the outer surface of the first structural layer.

In another embodiment of a method for making a device for containing a sample material, the method comprises providing a substrate that has a first panel and a second panel. The first panel and second panel are continuous and divided by a fold line. The method also comprises providing a first structural layer having an inner surface, an outer surface, and an edge; and a second structural layer having an inner surface and an outer surface. The second structural layer is separate from the first structural layer. Additionally, the method comprises applying an adhesive to the first panel of the substrate. The area of the first panel covered by the adhesive can be less than the area of the outer surface of the first structural layer. Moreover, a frangible layer is formed between the inner surface of the first structural layer and the inner surface of the second structural layer to attach the inner surface of the first structural layer to the inner surface of the second structural layer. The frangible layer includes a sample material. The outer surface of the second structural layer is attached to the second panel of the substrate. The method also includes folding the substrate at the fold line to attach the first panel of the substrate to the outer surface of the first structural layer using the adhesive applied to the first panel of the substrate. The frangible layer is set back from the edge of the first structural layer a first distance, and the adhesive attaching the first panel to the substrate to the outer surface of the first structural layer is set back from the edge of the first structural layer a second distance that is less than the first distance. Upon application of peel force stress between the first structural layer and the second structural layer, the frangible layer breaks for access to the sample material.

In some embodiments of the method, the outer surface of the second structural layer is attached to the second panel of the substrate such that the edge of the first structural layer is the side of the first structural layer that is furthest from the fold line. Also, in certain embodiments, the first structural layer and the second structural layer each comprise a material that has a Z direction strength that is substantially greater than the Z direction strength of the frangible layer between the first structural layer and the second structural layer.

BRIEF DESCRIPTION OF THE FIGURES

FIG. 1 is a cross-sectional view of a first embodiment of a device for containing a sample material.

FIG. 2 is a cross-sectional view of second embodiment of a device, which includes a carrier substrate, before the carrier substrate is folded at the fold line during manufacture.

FIG. 3 is a plan view of the device of FIG. 2.

FIG. 4 is a cross-sectional view of the device of FIG. 2 when the carrier substrate is folded at the fold line.

FIG. 5 is a cross-sectional view of a third embodiment of a device during manufacture before the carrier substrate is folded at the fold line.

FIG. 6 is a plan view of the device of FIG. 5.

FIG. 7 is a cross-sectional view of the device of FIG. 5 when the carrier substrate is folded at the fold line.

FIG. 8 is a cross-sectional view of a device when the carrier substrate is unfolded and the frangible layer is separated for access to the sample material.

FIG. 9 is a plan view of the device of FIG. 8 when the carrier substrate is unfolded and the frangible layer is separated for access to the sample material.

DETAILED DESCRIPTION

Figure 10:
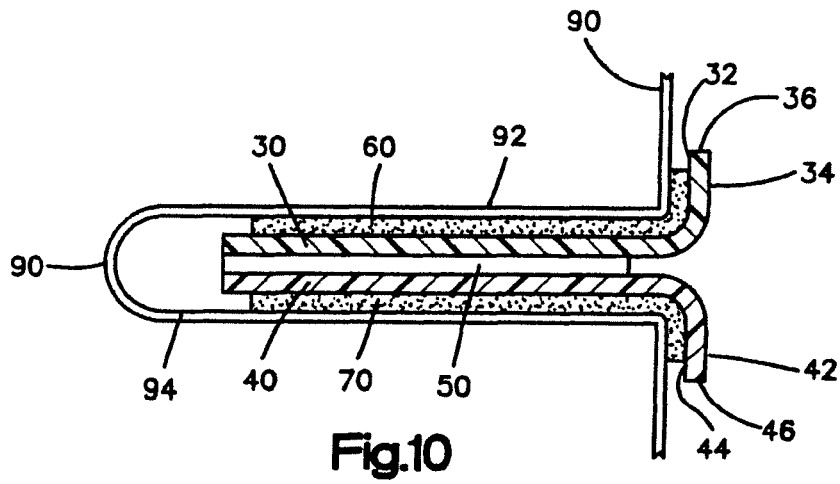
FIG. 10 is a cross-sectional view of a device when the panels of the carrier substrate are being separated at a 180° angle during a T-peel test.

One embodiment of the present device 10 for containing a sample material 51 includes a sampler 20 or fragrance delivery component. FIG. 1 shows an example of such device 10. The device 10 comprises a sampler 20 that includes a first structural layer 30 and a second structural layer 40 each having an inner surface 32, 42, an outer surface 34, 44, and a leading edge 36, 46, respectively; a frangible layer 50 attaching the inner surfaces 32, 42 of the first structural layer 30 and the second structural layer 40 together; and a sample material 51 (net shown) contained in the frangible layer 50. The outer surfaces 34, 44 of the first structural layer 30 and the second structural layer 40 comprise a structural interface in the form of an adhesive 60, 70. In other embodiments, only one of the outer surfaces may comprise an adhesive. Preferably, the outer surfaces 34, 44 of the first structural layer 30 and second structural layer 40 both comprise a structural interface in the form of a pressure sensitive adhesive. Also, the second structural layer 40 is preferably separate from the first structural layer 30.

The first structural layer 30 and the second structural layer 40 each comprise a material that has a Z direction strength that is greater than the Z direction strength of the frangible layer 50 between the first structural layer 30 and the second structural layer 40. The Z direction strength is the tensile strength of the material of the first structural layer 30 and the second structural layer 40 or frangible layer 50 measured in the direction perpendicular to the plane of such layers. When the material is paperboard, the Z direction tensile strength is referred to as the internal fiber bond strength of the paperboard. The structural interface has a bond strength that can be less than the Z direction bond strength.

As shown in FIG. 1, the frangible layer 50 is set back from the first structural layer leading edge 36 a first distance X, and the structural interface adhesive 60 on the outer surface 34 of the first structural layer 30 is set back from the first structural layer leading edge 36 a second distance Y. Distance Y is less than distance X. The frangible layer is set back from at least one common edge of the first and second structural layers 30, 40. Also, these set backs may be on one or more edges of the structural layers 30, 40. However, the set back should at least be on the leading edge 36 of the sampler 20 where a user will initiate separation of the first structural layer 30 from the second structural layer 40 to open the sampler 20. The structural interface adhesive 70 on the outer surface 44 of the second structural layer 40 may cover the entire outer surface 44.

Upon separation of the first structural layer 30 from the second structural layer 40, the frangible layer 50 breaks for access to the sample material. In particular, the device 10 is opened by tensile or peel force stress applied to the first structural layer 30 and second structural layer 40 that is transmitted from the structural interface adhesive 60, 70. Peeling is initiated from the direction beginning at the leading edge 36 from which the frangible layer 50 is set back. By initiating separation of the structural layers 30, 40 on such edge 36, the first structural layer 30 and second structural layer 40 remain intact as the frangible layer 50 breaks or separates so that the sample material may be accessed.

The device may further include a release liner attached to the outer surfaces of the first structural layer and/or second structural layer. In such case, the outer surface of the second structural layer or first structural layer preferably includes an adhesive, such as a pressure sensitive adhesive, and the release liner is attached to the pressure sensitive adhesive. For example, the first structural layer and/or second structural layer is coated with a pressure sensitive adhesive on its outer surface, which is further covered by the release liner, such as a siliconized release liner. Once the release liner is removed, a user may attach or mount the device to a substrate or target. An example of a suitable release liner is a double faced silicone release liner. Further, the double faced silicone release liner is preferably manufactured with a differential release value for greater controlled handling of the device. Such release liner may be rolled or stacked for storage such that there is contact with the opposite side of the release liner.

The device 10 of FIG. 1 has a planar shape, but the device 20 may be of various shapes.

A device 10 as shown in FIG. 1 may be mounted on a suitable printed carrier or substrate such as paper stock. Paper of varying grades and compositions, including recycled, colored, textured, coated, or uncoated, may be used. A wide variety of materials, other than paper stock, also may be used. For example, the substrate may be cover grade or light gage tag stock. Because the sampler formed by the first structural layer and the second structural layer substantially isolates the substrate from the sample material, problems of incompatibility between the substrate and the sample material are prevented by the present device.

The first and second structural layers 30, 40 are preferably made from a plastic film or web. Preferably, the first and second structural layers are made of a polyester, such as a biaxially oriented polyester film.

The first and second structural layers 30, 40 are also preferably made of a material that inherently provides barrier characteristics. The material used to form these layers should be substantially inert and preferably impermeable to the contents of sample material in order to substantially prevent migration of components of the sample material through the layers. Various types of plastic film may be used to form the first and second structural layers such as polyethylene terephtalate ("PET"), cellulosics or acetates. The structural layers may also incorporate specialty vapor barrier coatings to impart or enhance the barrier characteristics of this structural layer. Depending on the components of the sample material, a barrier material may be chosen which is a barrier to, for example, oil, gas, water vapor, aroma, or oxygen. The properties of these and other barriers are documented in publications, and they are readily available from commercial suppliers. The first and second structural layers may be made from a plastic film that may be clear or opaque, oriented or non-oriented, coated or uncoated, metalized, laminated with other materials, reinforced, or filled. In addition, coated or laminated paper, or any other paper grades which may be more compatible with the sample material than the carrier substrate, may be used to form the first and second structural layers. The process of making the first or second structural layers may be integrated into the device manufacturing process. For example, the structural layers may be cast or extruded thermoplastic or formed from a liquid film forming mixture. The first or second structural layers may also be comprised of a material that also functions as the structural interface adhesive. For example, specialty grades of hot melt pressure sensitive adhesive, especially those that provide a cross link functionality may be used. It will be apparent to those skilled in the art that any material with appropriate properties may be used to form the first and second structural layers. In addition, a material that does not possess barrier properties may be coated or treated in order to give it barrier properties so that the material may be used to form the first and second structural layers. Also, structural interface adhesives may be formulated to provide additional barrier properties. Such adhesives may contain agents such as oxygen scavengers or consist of film-forming precursors of high-barrier materials, such as latex-grade polyvinylidene chloride (PVdC).

The first structural layer and the second structural layer may be made of the same or different materials. Also, the first structural layer and second structural layer may each comprise more than one layer of material. Multiple layers may give the first structural layer and second structural layer additional or improved properties or an enhanced appearance. An inner layer, which is in direct contact with sample material, may be chosen based on its compatibility with sample material. An outer layer may be selected to provide more secure lamination or adhesion to the substrate or carrier sheet. The layers of a multi-layered first structural layer and/or second structural layer may be adhered together by many different methods which are known in the art.

In certain embodiments, the first structural layer and/or the second structural layer may be made from a material that comprises a substrate with a metal deposited thereon. The substrate can be formed from various types of materials, including, but not limited to, polymeric materials, (e.g., plastics), paper, metallic materials, and ceramic materials. The metals that can be deposited on the substrate include, without limitation, aluminum, platinum, gold and titanium. The metal can be deposited onto the substrate by methods that include, without limitation, vapor deposition, plasma deposition, and adsorption using a solution that includes the metal. In certain embodiments, the metal deposited on the substrate can form a layer that has a thickness of equal to or greater than about 0.01 microns, about 0.05 microns or about 0.1 microns. In other embodiments, the thickness can be equal to or less than about 35 microns, about 25 microns, or about 15 microns. Also, the thickness can be about 0.01 micron to about 35 microns; about 0.05 micron to about 25 microns; or about 0.1 micron to about 15 microns.

Preferably, the first structural layer and the second structural layer are each in the range of about 0.5 mil to about 2.0 mils thick (1 mil=24.5 microns). However, the first or second structural layer may be any suitable thickness. The preferred range of each layer thickness is from about 10 microns to about 500 microns.

The outer surfaces of the first structural layer and the second structural layer may include the same or different structural interface adhesives. Preferably, the outer surfaces of the first structural layer and the second structural layer comprise a structural interface in the form of a low odor pressure sensitive adhesive that has been applied from a water borne emulsion. The structural interface adhesive on the outer surface of the second structural layer may cover the entire contact area between the carrier substrate and the second structural layer. Alternatively, the structural interface adhesive may be applied in a specific pattern of lines or dots. Through the use of specific patterning, the structural interface adhesive may be manipulated and improved to provide the improved transfer of force from the carrier substrate to the structural layers while reducing or eliminating any permanent evidence of stress damage to the printed carrier substrate. For example, the adhesive pattern may be interrupted so as to improve the flex pattern of the first or second structural layer when coupled to the corresponding printed carrier substrate. Furthermore, the structural interface adhesive on the outer surfaces of the first and second structural layer is preferably permanent. The structural interface adhesive on the outer surface of the first structural layer may cover the entire or less than the entire outer surface of the first structural layer.

A transparent material for the second structural layer and the structural interface adhesive on the outer surface of the second structural layer may be used if the advertiser wishes text or artwork beneath the second structural layer to be visible to the consumer when using the device (i.e., when the substrate is unfolded and the sample material is accessed). The first structural layer and the structural interface adhesive on the outer surface of the first structural layer may also be transparent. The entire device may be transparent.

The first structural layer and second structural layer are attached together by the frangible layer. The frangible layer is a closure mechanism for the device. The frangible layer includes a frangible or breakable bond between the inner surfaces of the first structural layer and the second structural layer to form, for example, a device that has a unitized laminate structure. See, e.g., U.S. Pat. No. 6,245,176 to Greenland for methods of forming a frangible bond. This patent describes methods for forming peelable or frangible heat seals by heat sealing films of material together.

The frangible layer between the first and second structural layers breaks or separates when the first structural layer and second structural layer are pulled apart. The frangible layer may or may not be reformable or resealable. In the embodiment shown in FIG. 1, the frangible layer does not cover the entire inner surface of the second layer.

The frangible layer contains a sample material. The sample material is contained within the frangible layer so as to prevent leakage prior to use and to avoid contamination of the sample material by other components of the device. The frangible layer may include the sample material alone or it may also include other materials such as an adhesive. The adhesive may be admixed with the sample material in the frangible layer or the adhesive may be separate such that it corresponds to the periphery of the inner surfaces of the first structural layer and the second structural layer and the sample material is disposed within the periphery. The frangible layer may be applied by zone coating. For example, the frangible layer may comprise a zone coated adhesive line forming a geographic enclosure within the periphery of the inner surfaces of the first and second structural layers, wherein the sample material is disposed within the enclosure.

When the frangible layer includes the sample material without an additional adhesive, the sample material is preferably in a form that has adhesive properties such that the sample material will be effective in attaching the inner surface of the first layer to the inner surface of the second layer. For example, the sample material may be in the form of microcapsules that have adhesive properties. Alternatively, the sample material may be admixed with an adhesive binder. The frangible layer may attach the first structural layer and second structural layer using an adhesive seal, a heat seal, or any other suitable bonding method. Any seal may be used that does not react within the sample material. The sample material may also be contained between the first and second structural layers by means of auto adhesion or gasketing between the structural layers. The frangible layer is generally peelable.

The sample material is preferably a fragrance or cosmetic. Cosmetics include any external application intended to beautify or improve the complexion, skin, or hair. These include, for example, lipsticks, powders, foundations, mascaras, blushes, and eyeshadows. In addition to fragrances and cosmetics, a wide variety of other sample materials may be included in the frangible layer, such as personal care products, medical treatments, or food samples. In one embodiment, the sample material is a substantially unadulterated product such as a liquid perfume, in which case the materials of the first structural layer and second structural layer may be selected, for example, in accordance with the method disclosed in U.S. Pat. No. 5,439,172 to Comyn et al. However, suitable materials for the first structural layer and the second structural layer for use with a liquid fragrance sample material are not limited to those disclosed in the Comyn et al. patent. Substantially unadulterated products include any sample materials presented in their original or natural form, without being altered in any significant way. In alternative embodiments, the sample material comprises a product which is presented in another form, such as in a gel form, in a powder form, in microcapsules, or contained in a matrix material. In addition, the sample material may comprise volatile and/or non-volatile components. It will be readily apparent to those in the art that many other sample materials are suitable for use with the present device and method. Furthermore, the frangible layer may contain more than one sample material.

FIG. 2 is a cross-sectional view of another embodiment of a device 80 for containing a sample material. The device 80 of FIG. 2 includes a sampler 20 similar to that of FIG. 1. In particular, FIG. 2 includes a sampler 20 comprising a first structural layer 30 and a second structural layer 40 each having an inner surface 32, 42, an outer surface 34, 44, and a leading edge 36, 46; a frangible layer 50 attaching the inner surfaces 32, 34 of the first structural layer 30 and the second structural layer 40 together; and a sample material 51 contained in the frangible layer 50. The second structural layer 40 is separate from the first structural layer 30. A structural interface adhesive 60, 70 is disposed on the outer surfaces 34, 44 of the first structural layer 30 and the second structural layer 40. Preferably, the structural interface adhesives 60, 70 are permanent adhesives.

In this embodiment, the first structural layer 30 and the second structural layer 40 each comprise a material that has a Z direction strength that is greater than the Z direction strength of the frangible bond of the frangible layer 50 between the first structural layer 30 and the second structural layer 40.

The frangible layer 50 in FIG. 2 is set back from the first structural layer leading edge 36 a first distance X, and the structural interface adhesive 60 on the outer surface 34 of the first structural layer 30 is set back from the first structural layer leading edge 36 a second distance Y. Distance Y is less than distance X. These set backs may be on one or more edges of the layers 30, 40. However, the set back should at least be on the edge of the device 10 where separation of the first structural layer 30 and second structural layer 40 will be initiated to open the sampler 20, i.e., the leading edge.

At least one of the first structural layer 30 and the second structural layer 40 may be substantially transparent to light such that type face or creative graphics may be viewed therethrough. Preferably, both structural layers 30, 40 are transparent. Also, preferably, the structural interface adhesives 60, 70 are transparent.

In FIG. 2, the device 80 further includes a substrate such as a printed carrier substrate 90 having a first panel 92 and a second panel 94 that are continuous and divided by a fold line 96. FIG. 2 shows the device 80 during the manufacturing process before the substrate 90 is folded along the fold line 96.

The printed carrier substrate 90 may be a page of a magazine or a multi-page printed media. Thus, the first panel 92 is a flap attached to the second panel 94, which may be the same size or smaller than other pages in the magazine. In other embodiments, the substrate can either be a single material such as a carrier sheet that is folded over or can be two separate substrates. The two substrates may be the same or different materials. For example, the substrate or carrier sheet may be two pages of a magazine or two other materials including a page of a magazine, cardstock, paper or other material used for packaging and/or advertising purposes.

In FIG. 2, the sampler 20 is attached to the printed carrier substrate 90. The structural interface adhesive 70 on the outer surface 44 of the second structural layer 40 is disposed on the printed carrier substrate 90 such that the leading edge 36 of the first structural layer 30 is oriented to be the furthest edge of the first structural layer 30 from the fold line 96. The second structural layer 40 is attached to the second panel 94 of the substrate 90 by a structural interface adhesive 70. For example, the outer surface 46 of the second structural layer 40 may be joined to the second panel 94 of the printed carrier substrate 90 with a laminating adhesive. The adhesive functions as a structural interface between the first and second structural layers and the corresponding first and second layers of the printed carrier substrate. In addition, other attachment means may be used. Those skilled in the art will recognize that many different adhesives are suitable to accomplish this adhesion or lamination. For example, adhesives activated by heat, moisture, pressure, drying or radiation curing may be suitable. For example, the second layer may be heat laminated to the substrate. Also, the sampler 20 may be attached to either the first panel 92 or the second panel 94 in a variety of positions.

The frangible layer forms a bond between the inner surface of the first structural layer and the inner surface of the second structural layer in order to form a device that has a unitized laminate structure. The adhesive between the first panel of the carrier substrate and the outer surface of the first structural layer forms a first structural interface and the adhesive between the second panel of the carrier and the outer surface of the second structural layer forms a second structural interface.

The first structural layer 30 and the second structural layer 40 each comprise a material that has a Z direction strength that is substantially greater than the Z direction strength of the frangible bond of the frangible layer 50 between the first structural layer 30 and the second structural layer 40.

Upon application of tensile or peel force stress between the first structural layer and the second structural layer, the frangible layer breaks for access to the sample material. Tensile or peel force stress applied between the first and second structural layers is transferred from forces originating at the printed carrier substrate and transferred to the first and second structural layers through the adhesives that serve as structural interfaces. Also, tensile or peel force stress applied to the first and second panels of the printed carrier are transmitted through the first and second structural interface bonds and corresponding first and second structural layers to cause the cohesive failure of the frangible layer. The first and second panels of the printed carrier substrate serve to transmit and leverage force from the pivot point of the fold line and act upon the first and second structural layers of the device thereby breaking the frangible layer for access to the sample material. Thus, one panel acts as a lift tab for unfolding the substrate at the fold line and providing leverage thereby causing separation of the first structural layer from the second structural layer.

FIG. 3 is a plan view of the device 80 of FIG. 2. As shown in FIG. 3, the structural interface adhesive 60 on the outer surface 34 of the first layer 30 is set back from all four outer edges of the first layer 30. However, in other embodiments, it is only necessary for the adhesive to be set back from at least one side or edge and particularly from the leading edge where the layers will be first separated to access the sample material in the frangible layer. As shown in FIG. 3, the first panel 92 of the printed carrier substrate 90 does not include an adhesive before the substrate 90 is folded at the fold line.

FIG. 4 shows the device 80 of FIG. 3 after the printed carrier substrate 90 has been folded at the fold line 96. As shown in FIG. 4, when the printed carrier substrate 90 is folded at the fold line 96, the structural interface adhesive 60 on the outer surface 34 of the first structural layer 30 contacts the first panel 92 thereby attaching the first panel 92 of the printed carrier substrate 90 to the outer surface 34 of the first structural layer 30. The device 80 remains in the closed position until a user separates the first panel 92 from the second panel 92 of the printed carrier substrate 90. One panel acts as a lift tab for unfolding the substrate 90 at the fold line 96. Force applied to the panels is transferred to the first structural layer 30 and the second structural layer 40 through the structural interface adhesives 60, 70 thereby breaking the frangible layer 50 for access to the sample material. In the folded position, the panels 92, 94 are only attached at the fold line 96 when it is folded, as the frangible layer is the only means of maintaining the substrate in the folded position. Thus, the panels are only directly attached at the fold line and indirectly attached through the frangible layer. The panels are not directly attached at any other location.

When the substrate is folded at the fold line, the adhesive on the outer surface of the first structural layer contacts the first panel thereby attaching the first panel of the substrate to the outer surface of the first structural layer. Adhesive bonding between the first and second panels of the printed carrier substrate and the structural layer is preferably instantaneous so that there is no need for subsequent drying or curing of the adhesive. Also, the first and second panels of the printed carrier substrate serve to transmit and leverage force from the pivot point of the fold line and act upon the first and second structural layers of the device thereby breaking the frangible layer for access to the sample material.

In certain embodiments where the device 80 includes a substrate 90 such as a printed carrier substrate attached to at least one of the first or second structural layers 30, 40, such as the device 80 shown in FIG. 4, the frangible layer 50 forms a first bond between the inner surfaces 32, 42 of the first structural layer 30 and the second structural layer 40, and the adhesive 60 forms a second bond between the first panel 92 and the outer surface 34 of the first layer 30, wherein the Z direction tensile strength of the second bond is stronger than the Z direction tensile strength of the first bond. The first and second structural layers 30, 40 function to prevent undesirable physical deformation and damage to the surface of the panels 92, 94 of the substrate 90 that may otherwise result absent the presence of the first and second structural layers 30, 40.

FIG. 5 shows an alternative embodiment of a device 100 for containing a sample material that includes a printed carrier substrate 90. In this embodiment, the device 100 includes a sampler 20 including a first structural layer 30, second structural layer 40, and a frangible layer 50 attaching the first structural layer 30 to the second structural layer 40, and a structural interface adhesive 70 on the outer surface 44 of the second structural layer 40 that is attached to a second panel 94 of a printed carrier substrate 90. When the sampler 20 is attached to the printed carrier substrate 90, the leading edge 36 of the first structural layer 30 of the sampler 20 is oriented so as to be furthest from the fold line 96 of the printed carrier substrate 90, as shown in FIG. 5. A structural interface adhesive 60 is placed on the first panel 92 of the printed carrier substrate 90. Preferably, the structural interface adhesive 60 is a permanent pressure sensitive adhesive. In this embodiment, the outer surface 34 of the first structural layer 30 does not include an adhesive prior to folding the printed carrier substrate 90 at the fold line 96.

FIG. 6 shows a plan view of the device 100 of FIG. 5. As shown in FIG. 6, structural interface adhesive 60 is applied to the first panel 92 of the printed carrier substrate 90. The structural interface adhesive 60 may be applied in a zone-coated pattern. In this view, only the outer surface 34 of the first structural layer 30 of the sampler 20 is visible on the second panel 94 of the printed carrier substrate 90. The structural interface adhesive 60 on the first panel 92 is placed in such a position that the structural interface adhesive 60 will contact the outer surface 34 of the first structural layer 30 when the printed carrier substrate 90 is folded at the fold line 96. The area of the structural interface adhesive 60 on the first panel 92 is less than the area of the outer surface 34 of the first structural layer 30.

FIG. 7 is a cross-sectional view of the device 100 of FIGS. 5 and 6, when the printed carrier substrate 90 is folded at the fold line 96. The structural interface adhesive 60 is applied to a portion of the first panel 92 of the printed carrier substrate 90 such that the structural interface adhesive 60 contacts the outer surface 34 of the first structural layer 30 thereby attaching the first panel 92 of the printed carrier substrate 90 to the outer surface 34 of the first structural layer 30 when the printed carrier substrate 90 is folded at the fold line 96. Also, the area covered by the structural interface adhesive 60 on the first panel 92 is less than the area of the outer surface 34 of the first structural layer 30. The frangible layer 50 is set back from the first structural layer edge 36 a first distance X, and when the printed carrier substrate 90 is folded at the fold line 96, the structural interface adhesive 60 on the first panel 92 is set back from the first structural layer edge 36 a second distance Y that is less than the first distance X. The distance represented by Y need only be large enough to insure acceptable machine tolerances and prevent accidental bonding of the first panel 92 and second panel 94. Suitable dimensions for Y are, for example, between 0.00 and 0.125 inches. Preferably, the differential distance represented by X minus Y should be sufficient to allow flex and bend of the panels 92, 94 and structural layers 30, 40 outward from a parallel position to form a shallow angle prior to initiation of Z direction tensile force applied to frangible layer 50. Suitable dimensions represented by X minus Y are, for example, between 0.0625 and 0.250 inches.

When the printed carrier substrate 90 is folded, one panel acts as a lift tab for unfolding the printed carrier substrate 90 at the fold line 96 to separate the first structural layer 30 from the second structural layer 40 thereby breaking the frangible layer 50 for access to the sample material. Thus, in the embodiments shown in FIGS. 4 and 7, it is not necessary for the user to separate the first structural layer 30 from the second structural layer 40 by directly contacting and pulling apart either the first structural layer 30 or second structural layer 40. Instead, the user can pull apart the panels of the printed carrier substrate 90 to easily separate the first and second structural layers 30, 40 from each other with the benefit of additional mechanical leverage provided by the panels. Also, there is no need to extend the materials of the structural layers 30, 40 outward further to create a peel tab.

When peel force is applied to the panels 92, 94 the panels and corresponding structural layers 30, 40 within the set back area X are able to flex and bend. Bending occurs at a pivot point corresponding to the leading edge of the frangible layer 50. The extent of bending an angle between the panels reached is variable and increases with force. The maximum angle that may be achieved being 180 degrees. The force required to pull apart the frangible layer 50 can be substantially greater than the actual Z direction tensile or ply bond strength of the panels without evidence of physical damage. This is possible due to the redirection and redistribution of force facilitated by the bending within set back X in combination with structural interface adhesive 60. Also, when the device is opened (or unfolded), the frangible layer will separate down the middle and not destroy the other parts of the device. Furthermore, the amount of force required to pull apart the structural layers can be higher than the amount of force required to separate the structural layers from the panels of the substrate alone.

FIG. 8 shows a device 120 in which a printed carrier substrate 90 has been unfolded. In particular, FIG. 8 shows a device 90 in which the first panel 92 has been separated from the second panel 94 such that the frangible layer 50 initially breaks at the leading edge 36 of the first structural layer 30 and the second structural layer 40. Thus, when the panels 92, 94 are separated, the sampler 20 breaks or separates at the frangible layer 50. While the frangible layer 50 breaks, the first structural layer 30, second structural layer 40 and substrate 90 remain in tact. Structural interface adhesives 60, 70 serve to improve the flex modulus of the combined layers, distribute force and prevent visible physical damage. FIG. 8 shows the frangible layer 50 remaining on the inner surface 42 of the second structural layer 40. However, a portion of the frangible layer 50 or all of the frangible layer 50 may adhere to the inner surface 32 of the first structural layer 30 when the printed carrier substrate 90 is unfolded. Due to the configuration of the frangible layer 50, the first structural layer 30 and the structural interface adhesive 60 on the outer surface 34 of the first structural layer 30, the sampler separates at the frangible layer 50 without ripping the structural layers 30, 40, and the force required to open the device can be higher and have a higher snap level than devices without such configuration. In this way, the peel strength required to open the device can exceed 2.5 lbs per linear inch. When the printed carrier substrate 90 is unfolded, as shown in FIG. 8, the sample material 51 contained in the frangible layer 50 can be accessed.

FIG. 9 is a plan view of the device 120 of FIG. 8 showing the first structural layer 30 on the first panel 92 and the second structural layer 40 and the frangible layer 50 remaining on the second panel 94 after the printed carrier substrate 90 has been unfolded at the fold line 96 so that the sample material may be accessed. The frangible layer 50 is set back from the leading edge 36 of the second structural layer 40.

Figure 11:
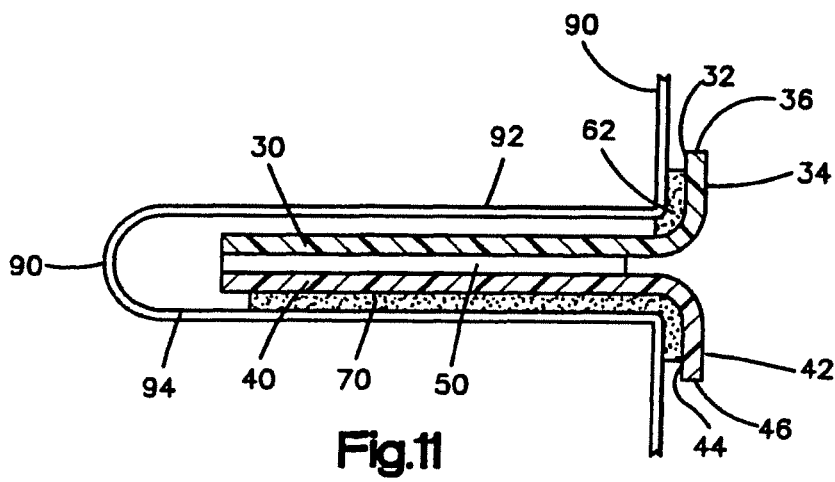
FIG. 11 is a cross-sectional view of a device when the panels of the carrier substrate are being separated at a 180° angle during a T-peel test.
Figure 12:
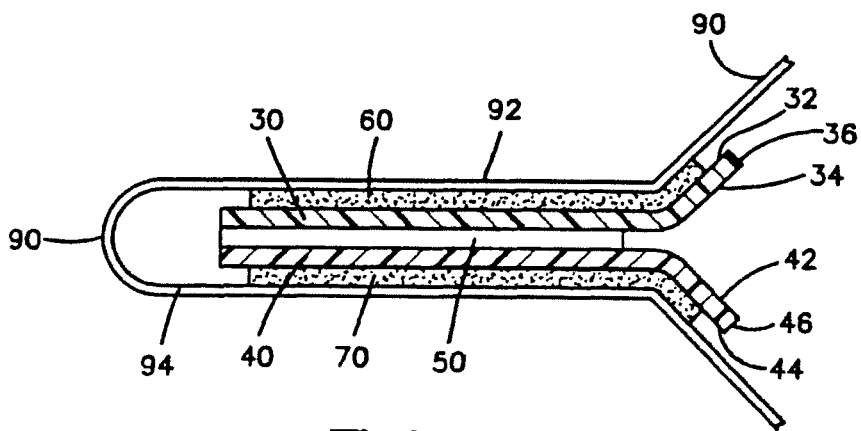
FIG. 12 is a cross-sectional view of a device when the panels of the carrier substrate are being separated at a 90° angle during a T-peel test.

A T peel-force measurement test may be performed to measure the strength required to unfold or open the present device. FIGS. 10, 11, and 12 show a cross-section of devices during T peel force measurement tests which measures the strength required to open a device by separating the first panel and the second panel. In FIGS. 10 and 11, the panels are separated at the maximum 180° angle. FIG. 11 shows a T peel force measurement test on a device that has a partial structural interface adhesive 62 on the outer surface of the first structural layer. In FIGS. 10 and 11, the force transmitted to the frangible layer in the T-Peel test can exceed 3,000 grams/linear inch without physically damaging any part of the device except the frangible layer. The configuration of the structural layers and the structural interface adhesive help distribute the forces applied to the device and prevent damage upon unfolding of the device. The structural interface adhesive allows the two materials (the substrate and the structural layers) to interact without damaging either layer. Preferably, the adhesive is compliant and bendable. In contrast, a typical T peel force value without physical damage using a device having a frangible adhesive between two panels of a carrier substrate without structural layers is less than 500 grams per inch.

FIG. 12 shows a device similar to that of FIGS. 10 and 11, except that the panels are being separated at a 90° angle to each other. (See ASTM method D6862-04). There is a full adhesive between the outer surface of the first structural layer and the first panel of the carrier substrate. In FIG. 12, the force transmitted to the frangible layer in the T-Peel test can exceed 1,500 grams/linear inch without physically damaging any part of the device except the frangible layer.

Advertising text and artwork may cover any surface of the substrate. For example, advertising text or artwork may be printed on both front and back surfaces of the substrate such that when the substrate is folded, these surfaces may present a coordinated or continuous artwork or advertising message. Artwork or text may also be printed on the surface of the substrate underneath the second structural layer, or on the outer surface of the second structural layer itself, such that the artwork or text becomes visible to the user of the device when it is opened. The back surface of the substrate is also suitable for displaying text and artwork. It is contemplated that when the device is bound into publications such as magazines or catalogs with advertising text or artwork printed on one or both sides, it will look substantially similar to pages of advertisement typically found in magazines.

The devices described above may be made using different methods. In such methods, the first structural layer, the second structural layer and the frangible layer therebetween are first assembled to form a sampler. The sampler may then be applied to a substrate. The sampler may be made in a separate manufacturing process or production line from the process of applying the sampler to a substrate. By doing so, graphics may be added to the substrate without contaminating the sample material, a wider variety of substrates may be used, and the production lines for making the sampler and for attaching the substrate can be separate. Prefabrication of the sampler also provides for process speed optimization of the print and samples fabrication process independently. Higher levels of quality control standards for the sampler may be attained in this fashion without significant negative impact upon the print and final fabrication cost of the device.

The sampler may be assembled using any suitable method. For example, the sampler may be assembled as described in U.S. Pat. No. 5,439,172 to Comyn et al. The first structural layer and second structural layer may be formed by web structures which are kiss-cut to form individual samplers.

If the first structural layer and the second structural layer of the sampler do not include an adhesive, an adhesive is added to the outer surfaces of one or both of the structural layers. Preferably, the outer surfaces of the first structural layer and the second structural layer include a pressure sensitive adhesive. In such case the pressure sensitive adhesive is zone coated on the outer surfaces of the first and second structural layers and preferably covers less than the entire outer surface of each layer.

A release liner may be applied to the outer surfaces that have an adhesive thereon. Preferably, the release liner is a silicone coated polyester release liner. In such case, the release liner may be later removed and the sampler attached to a substrate as described below. When the sampler has pressure sensitive adhesive on the outer surfaces of the first structural layer and the second structural layer with one side having a release liner thereon, the samplers may be wound on a web for later use. In another embodiment, the sampler, with adhesive on at least one of the outer surfaces of the first structural layer and the second structural layer, may be attached to a substrate without first applying a release liner.

In one embodiment, the sampler is attached to a substrate having a first panel and second panel and a fold line dividing the panels as described above. The outer surface of the second structural layer of the sampler is attached to the second panel, though the sampler may be applied to either panel. The second structural layer of the panel may be applied by any suitable method such as lamination. If the outer surface of the first structural layer does not include an adhesive, then an adhesive is applied to the first panel of the substrate.

The substrate is folded at the fold line such that the first panel contacts and adheres to the outer surface of the first structural layer. A folding plough may be used in the manufacturing process to fold the substrate at the fold line.

Preferably, adhesive bonding between the first and second panels of the printed carrier substrate and the structural layers is instantaneous and there is no need for subsequent dry or cure of the adhesive.

Once the substrate is folded, the device may be distributed to users. As discussed above, one panel of the substrate acts as a lift tab for unfolding the substrate at the fold line to separate the first structural layer from the second structural layer thereby breaking the frangible layer for access to the sample material. The above methods do not require that the sampler be precisely positioned on a substrate when manufacturing devices that include graphic images. The sampler may be integrated into a magazine page or other substrate at high speed with liberal placement tolerances. The present device can be advantageously designed so as to place tolerances such as those represented by setbacks "X" and "Y" in the cross web direction thereby reducing waste and increasing operational efficiency of the production process.

The description contained herein is for purposes of illustration and not for purposes of limitation. Changes and modifications may be made to the embodiments of the description and still be within the scope of the invention. Also, all references cited above are incorporated herein, in their entirety, for all purposes related to this disclosure.

What is claimed is:

1. A device for containing a sample material comprising:
a first structural layer having an inner surface, an outer surface, and an edge;
a second structural layer having an inner surface and an outer surface, wherein the second structural layer is separate from the first structural layer, and the outer surfaces of the first structural layer and the second structural layer comprise an adhesive;
a frangible layer attaching the inner surface of the first structural layer to the inner surface of the second structural layer, wherein the frangible layer is set back from the edge of the first structural layer a first distance, and the adhesive on the outer surface of the first structural layer is set back from the edge of the first structural layer a second distance that is less than the first distance; and a sample material contained in the frangible layer, wherein the first structural layer and the second structural layer each comprise a material that has a Z direction tensile strength that is substantially greater than the Z direction tensile strength of the frangible layer between the first structural layer and the second structural layer, and wherein upon application of peel force stress between the first structural layer and the second structural layer, the frangible layer breaks for access to the sample material.

2. The device of claim 1, wherein the adhesive on the outer surface of at least one of the first structural layer and the second structural layer is a pressure sensitive adhesive.

3. The device of claim 1, wherein the frangible layer comprises an adhesive line within the periphery of the inner surfaces of the first structural layer and the second structural layer thereby forming an enclosure, and the sample material is disposed within the enclosure.

4. The device of claim 1, wherein the frangible layer comprises an adhesive admixed with the sample material.

5. The device of claim 1, wherein the first structural layer and the second structural layer are resealable.

6. The device of claim 1, wherein the sample material comprises a fragrance.

7. The device of claim 1, wherein the device is planar.

8. The device of claim 1 further comprising a printed carrier substrate comprising a first panel and a second panel, wherein the first panel and the second panel are continuous and divided by a fold line, and the outer surface of the second structural layer is attached to the second panel of the substrate such that the edge of the first structural layer is the side of the first structural layer that is furthest from the fold line, and the outer surface of the first structural layer is attached to the first panel of the substrate.

9. The device of claim 1, wherein at least one of the first structural layer and the second structural layer is substantially transparent to light such that type face or graphics may be viewed therethrough.

10. The device of claim 8, wherein the substrate has a front surface and a back surface, wherein advertising text or art work is printed on both the front and back surfaces of the substrate such that when the substrate is folded at the fold line, the front and back surfaces of the substrate present a continuous advertising text or art work.

11. A device for containing a sample material comprising:
a first structural layer having an inner surface, an outer surface, and an edge;
a second structural layer having an inner surface and an outer surface, wherein the second structural layer is separate from the first structural layer;
a frangible layer attaching the inner surface of the first structural layer to the inner surface of the second structural layer to form a sampler,
a sample material contained in the frangible layer;
a printed carrier substrate comprising a first panel and a second panel, wherein the first panel and the second panel are continuous and divided by a fold line, wherein the outer surface of the second structural layer of the sampler is attached to the second panel of the substrate, and the edge of the first structural layer is the side of the first structural layer furthest from the fold line; and
a permanent adhesive applied to a portion of the first panel of the substrate such that the adhesive contacts the outer surface of the first structural layer thereby attaching the first panel of the substrate to the outer surface of the first structural layer when the carrier is folded at the fold line, wherein the area covered by the adhesive on the first panel is less than the area of the outer surface of the first structural layer, the frangible layer is set back from the first structural layer edge a first distance, and when the substrate is folded at the fold line, the adhesive on the first panel is set back from the first structural layer edge a second distance that is less than the first distance, wherein the first structural layer and the second structural layer each comprise a material that has a Z direction tensile strength that is substantially greater than the Z direction tensile strength of the frangible layer between the first structural layer and the second structural layer, and wherein one panel acts as a lift tab for unfolding the substrate at the fold line thereby separating the first structural layer from the second structural layer and breaking the frangible layer for access to the sample material.

12. The device of claim 11, wherein the frangible layer comprises an adhesive near the periphery of the inner surfaces of the first structural layer and the second structural layer thereby forming an enclosure, and the sample material is disposed within the enclosure.

13. The device of claim 11, wherein the frangible layer comprises an adhesive admixed with the sample material.

14. The device of claim 11, wherein the sample material comprises a fragrance.

15. The device of claim 11, wherein at least one of the first structural layer and the second structural layer is substantially transparent to light such that type face or graphic images may be viewed therethrough.

16. The device of claim 11, wherein the first structural layer and the second structural layer are resealable.

17. The device of claim 11, wherein the sampler is planar.

18. The device of claim 11, wherein the substrate has a front surface and a back surface, wherein advertising text or art work is printed on both the front and back surfaces of the substrate such that when the substrate is folded at the fold line, the front and back surfaces of the substrate present a continuous advertising text or art work.

* * * * *